UNITED STATES PATENT OFFICE.

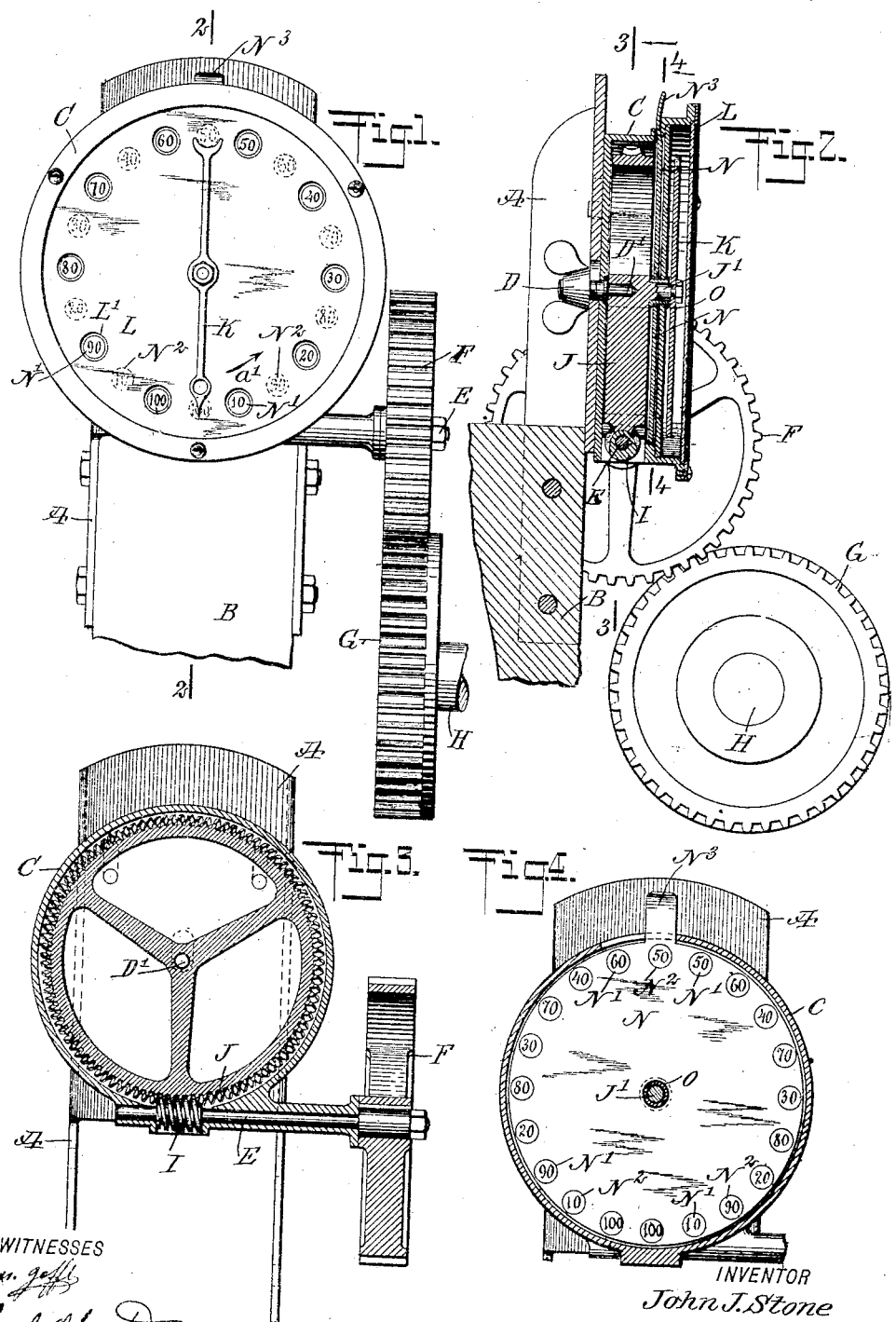

JOHN JULIUS STONE, OF BERESFORD, SOUTH DAKOTA.

ODOMETER.

966,263.

Specification of Letters Patent. Patented Aug. 2, 1910.

Application filed September 18, 1908. Serial No. 453,605.

*To all whom it may concern:*

Be it known that I, JOHN JULIUS STONE, a citizen of the United States, and a resident of Beresford, in the county of Union and State of South Dakota, have invented a new and Improved Odometer, of which the following is a full, clear, and exact description.

The object of the invention is to provide a new and improved odometer, for use on engines and other motors and machines, and arranged to accurately indicate the speed of the machine, thus permitting the attendant in charge to regulate the speed of the machine according to the work to be performed.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a face view of the improvement; Fig. 2 is a transverse section of the same on the line 2—2 of Fig. 1; Fig. 3 is a sectional front elevation of the same on the line 3—3 of Fig. 2; and Fig. 4 is a similar view of the same on the line 4—4 of Fig. 2.

The odometer is mounted on a bracket A, attached to a support B, arranged on the engine or other motor or machine, the speed of which is to be indicated by the speed indicator. On the bracket A is adjustably secured a casing C, by the use of a bolt D, and in the said casing C is journaled a shaft E, carrying on its outer end a gear wheel F, in mesh with a gear wheel G, secured on the shaft H, of the engine or other motor or machine the speed of which is to be indicated. On the shaft E is secured a worm I, in mesh with a worm wheel J, arranged within the casing C and mounted to turn on the inner end D' of the bolt D above mentioned and shown in Fig. 2. The worm wheel J is provided at its front with a central stud J', on which is secured a pointer K, arranged in front of a plate L, having a circular row of apertures L', through which appears one of two sets of numerals N', N² arranged on a dial N, mounted to turn loosely in the casing C on a bushing O, held loosely on the stud J', and which bushing O also carries the plate L. The dial N is provided at the top with a handle N³, extending through a slot in the top of the casing C to the outside thereof, to permit the operator to turn the dial N, so as to bring either set of numerals N' or N² in register with the row of apertures L' in the plate L. By the arrangement described, the odometer can be applied to a shaft H, driven in either direction, as the operator will then set the dial N correspondingly, that is, to bring the corresponding set of numerals N' or N² in register with the apertures L'. The worm wheel J is provided with a hundred teeth and the dial N is divided in a hundred parts, and the gear wheels F and G are alike in diameter.

Now when the odometer is in use and the shaft H is running, then the gear wheels G and F rotate the worm shaft E, which by the worm I causes the worm wheel J to rotate slowly and with it the pointer K, so that the latter indicates on the set of numerals N' or N² appearing through the apertures L' of the plate L.

As shown in Fig. 1, the pointer K travels in the direction of the arrow a', but in case the shaft H runs in a reverse direction, the dial N is shifted to bring the set of numerals N² in register with the apertures L', the pointer K then traveling in the reverse direction of the arrow a'.

It is understood that the dial N is graduated in tenths from zero to hundred in both directions, and the worm wheel J is provided with one hundred teeth, and at every revolution of the worm wheel I, the dial N is turned the distance of one hundredths part of its graduation, and at every ten revolutions of the worm wheel I, a graduation mark N' (or N²) will appear in the corresponding aperture L'. Now by the operator timing the pointer K as it makes one complete revolution at a given or normal rate of the speed of the shaft H, it will be easy to determine the subsequent speed of the shaft H, if the latter runs faster or slower by again timing the pointer as it advances from between the adjacent ten points.

Having thus described my invention, I claim as new and desire to secure by Letters Patent:

1. An odometer comprising a casing, a bolt for securing the casing to a support, the bolt projecting into the casing, a worm wheel mounted on the bolt within the casing and having a stud projecting from its front face, a plate secured upon the stud and provided with a circular row of apertures, a pointer on the stud in front of the plate, a dial loosely mounted on the stud between the plate and worm wheel, and a shaft mounted in the casing and provided with a worm meshing with the worm wheel.

2. An odometer comprising a slotted casing adapted to be secured to a support, a worm wheel mounted in the casing and provided with a stud projecting from its front face, a bushing mounted on the stud, a plate carried by the bushing and having a circular row of apertures, a dial loosely mounted on the bushing between the worm wheel and plate and having two sets of numerals thereon, said dial being provided with a handle projecting through the slot of the casing, a pointer secured to the stud of the worm wheel in front of the plate, and a driven shaft mounted in the casing and provided with a worm meshing with the worm wheel.

In testimony whereof I have signed my name to this specification in the presence of two subscribing witnesses.

JOHN JULIUS STONE.

Witnesses:
A. F. CRANDALL,
G. E. DAVIS.